United States Patent Office 3,472,912
Patented Oct. 14, 1969

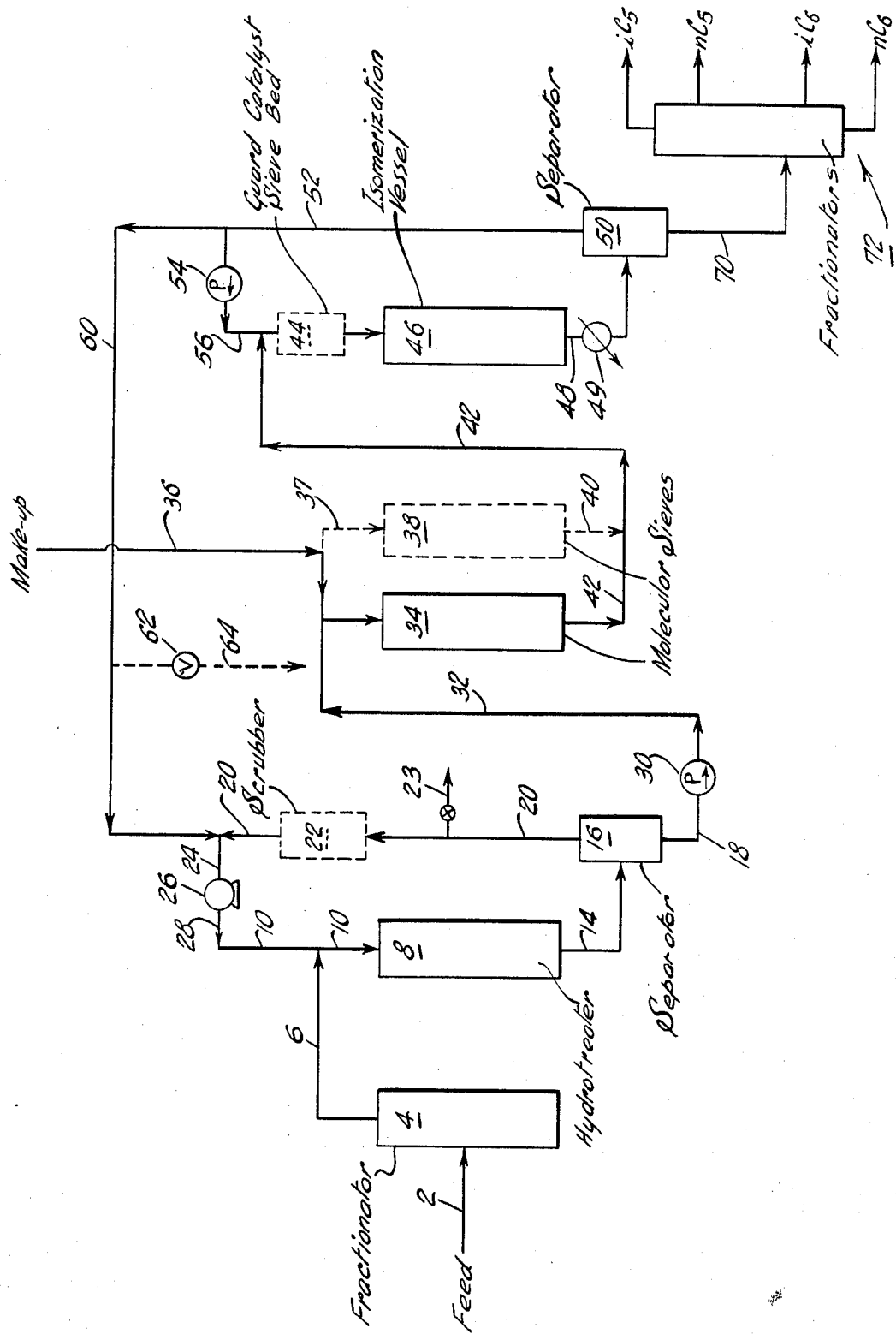

3,472,912
ISOMERIZATION PROCESS EMPLOYING
HYDROTREATING AND MOLECULAR
SIEVE PURIFICATION
Robert E. Quisenberry, Port Arthur, Tex., assignor to
Texaco, Inc., New York, N.Y., a corporation of
Delaware
Filed Sept. 22, 1966, Ser. No. 581,251
Int. Cl. C07c 5/24
U.S. Cl. 260—683.65     5 Claims

ABSTRACT OF THE DISCLOSURE

A process is provided for isomerizing $C_4$ to $C_7$ isomerizable hydrocarbons containing impurities deleterious to isomerization catalyst life by hydrotreating the isomerizable hydrocarbon, separating the gaseous hydrotreated effluent and recycling the same to the hydrotreating step, selectively separating impurities from the isomerizable hydrocarbon effluent and from a hydrogen stream and introducing the effluent and hydrogen stream into an isomerization reactor, separating from the isomerization effluent a hydrogen stream and recycling the hydrogen to the hydrotreating and isomerization steps.

---

This invention relates to a process for isomerizing isomerizable hydrocarbons. More particularly, this invention relates to a process for isomerizing isomerizable hydrocarbons wherein the apparatus needed to perform the process is relatively simple, the charge to the vessel in the process design is high relative to the capacity of the vessels themselves and wherein drastic steps needed to purify various gases utilized in the process are avoided.

The isomerization of isomerizable hydrocarbons is a very important step in petroleum refining. It enables the adjustment of the octane number upwards by converting normal paraffins, such as normal hexane, to isoparaffins, such as 2,2-dimethylbutane. A blend of various isomeric paraffins provides a gasoline which has a higher octane number than a gasoline consisting of normal paraffins. Isomerization is generally performed by passing isomerizable hydrocarbons together with hydrogen through a reaction zone containing an isomerization catalyst. The hydrogen to hydrocarbon mol ratio varies within a wide range, generally from 0.05:1 to 5:1, preferably within the range of about 0.5:1 to 2:1 for pentanes and hexanes and 0.1:1 to 1:1 for butanes. The reaction temperature will depend upon the specific hydrocarbons being isomerized and the nature and type of catalyst employed. Hydrocarbon streams consisting chiefly of pentanes and hexanes are isomerized at temperature within the range of 250–350° F. and preferably within the range of 280–330° F. Butane isomerization is effected at temperatures within the range of 300–400° F. and preferably within the range of 315–350° F. The isomerization, normally effected under pressure, may be carried out in the liquid or vapor phase. Generally, pressures within the range of 300–750 p.s.i.g. have been found convenient. A liquid hourly space velocity (LHSV), that is, the volume of liquid charged per hour per volume of catalyst, within the range of 0.5 to 10.0 and preferably within the range of about 0.75 to 4.0 is employed.

The isomerization catalyst is suitably one prepared in accordance with the procedure of copending application Ser. No. 419,755 assigned to the assignee hereof. Preferably, this catalyst consisting of a platinum-alumina composite activated with a chlorinated hydrocarbon, e.g., $CCl_4$, is stabilized in accordance with the process of U.S. Patent 3,242,228.

The problems which exist in the isomerization of say debutanized light straight run naphtha are numerous. It has been found that the inclusion of minor amounts of oxygen, sulfur, their compounds or nitrogen compounds can have a serious effect on the life of the isomerization catalyst. It is therefore desirable to remove these impurities or to counter their degradative effect upon the isomerization catalyst by a method which permits a continuous isomerization process and does not entail a high capital outlay. It is also desirable that a commercially operable process for isomerizing hydrocarbons be provided wherein the method for counteracting the effects of impurities within the feed does not cause any cracking of the hydrocarbons to less desirable products. It is still further desired that a process be provided wherein impurities can be taken out of a feed to be isomerized by a method which does not entail high capital outlay.

It is an object of this invention therefore to provide a process for isomerizing isomerizable hydrocarbons, e.g. those within the $C_4$–$C_6$ range, which enables use of the isomerization catalyst over a long period of time.

It is another object of this invention therefore to provide an isomerization process which does not entail high capital outlay for apparatus employed in the process and which eliminates from the streams to the isomerization reactor impurities having a deleterious effect on the isomerization catalyst.

These and other objects of this invention will become apparent from the following complete description, the drawing and the claims.

Broadly this invention contemplates a process for isomerizing isomerizable hydrocarbons, particularly those within the $C_4$–$C_6$ range, which comprises:

(a) Hydrotreating isomerizable hydrocarbon containing an impurity of the group oxygen, sulfur, compounds thereof, nitrogen compounds and unsaturated hydrocarbons in the presence of a hydrogenation catalyst resistant to said impurity under hydrotreating conditions;

(b) Separating the gaseous effluent from the liquid effluent and recycling at least a portion of said gaseous effluent to the hydrotreating vessel;

(c) Selectively separating the impurities therefrom as by passing the so-treated isomerizable hydrocarbon through a molecular sieve bed or passing through a vessel containing molten sodium and admixing purified hydrogen with the purified isomerizable hydrocarbon effluent;

(d) Introducing hydrogen and said isomerizable hydrocarbon in mol ratio of between 0.05:1 and 5:1 to an isomerization reactor containing an isomerization catalyst, said reactor maintained under conditions of temperature and pressure suitable for isomerization;

(e) Withdrawing the isomerization effluent, separating hydrogen from said effluent and recycling at least a portion of said hydrogen to the isomerization process upstream of the isomerization reactor; and (f) Recycling at least a portion of the hydrogen effluent from the isomerization vessel to the hydrotreating process.

The present invention can be more readily understood by reference to the accompanying flow diagram. A feed containing isomerizable hydrocarbons, suitably debutanized light straight run naphtha, is fed into a fractionator 4 through line 2 and an overhead containing say a $C_5/C_6$ hydrocarbon fraction is taken overhead through line 6 and introduced into hydrotreater 8 via line 10. Recycle hydrogen from the isomerization vessel 46, line 48, high pressure separator 50 and lines 52 and 60 is introduced into line 10 via line 24, compressor 26 and line 28. Within hydrotreater 8 any oxygen present as such or in compound form in the overhead entering hydrotreater 8 via lines 6 and 10 is converted to water, any sulfur in elemental or compound form is converted to $H_2S$, any nitrogen in compound form is converted to ammonia and a substantial quantity of unsaturated compounds is saturated. The so-treated hydrocarbons containing hydrogen and impurities such as ammonia, H₂S and water are withdrawn in line 14 and enter separator 16. The gaseous effluent is separated from the liquid effluent within separator 16. The liquid effluent is discharged from separator 16 through line 18. The gaseous effluent is discharged from separator 16 into line 20 and may be passed through a scrubber represented by dotted lines 22 and thence to line 24 although this is not usually necessary even in commercial operations. A bleed line 23 is provided between the separator 16 and the scrubber 22 for bleeding the gas in line 20 should the concentrations of impurities reach high levels. At least a portion of the gaseous effluent from separator 16 is reintroduced to the hydrotreater 8 via lines 28 and 10. The catalyst in hydrotreater 8 is one which is which is resistant to the degradative effects of any impurity in the feed to the hydrotreater from line 6. A suitable catalyst for this purpose is nickel-molybdenum on alumina such as American Cyanamid HDS-3 catalyst, cobalt-molybdenum on alumina, nickel sulfide-tungsten sulfide on alumina, the latter of which is available under the designations Ni-4403 or Ni-4405 from Harshaw Chemical Company.

The isomerizable hydrocarbons discharged into line 18 are pumped into hydrocarbon molecular sieve bed 34 via pump 30 and line 32. Most of the impurities which are not taken off in the bleed line 23 or absorbed in the scrubber 22 and become dissolved in hydrocarbon liquid are collected in the molecular sieve bed 34 using molecular sieve of sufficient size to collect these impurities. In this regard it has been found that a 4 A sieve is suitable to pick up water, H₂S and ammonia which may have been carried through line 18 in solutions in the liquid hydrocarbon feed en route to the isomerization reactor. It is also desirable in conjunction with utilization of the 4 A. molecular sieve to utilize a molecular sieve of sufficient size to absorb any undesirable unsaturated hydrocarbons. For this purpose a 13X sieve can suitably be used in conjunction with or in place of the 4 A. sieve in sieve bed 34. Into the liquid-hydrocarbon feed at this point there is introduced makeup hydrogen suitably from a catalytic reforming unit. The make-up hydrogen is introduced via line 36. It is purified using the same molecular sieve bed used to purify the liquid isomerizable hydrocarbon charge to the isomerization reactor or it is fed via line 37 to a separate hydrogen molecular sieve bed 38 containing 4 A. or 13X sieve wherein the hydrogen is purified by retention of water, H₂S and/or ammonia therein. If the makeup hydrogen is purified using hydrogen molecular sieve bed 38 it is withdrawn therefrom in line 40 and line 42 which carries the liquid hydrocarbon discharged from the hydrocarbon molecular sieve bed 34. The mixture of the hydrogen and liquid hydrocarbon pass through line 42 and preferably through guard catalyst bed 44. Recycle hydrogen from isomerization vessel 46 enters line 42 joining with the makeup hydrogen therein and the liquid hydrocarbon such that the hydrogen to hydrocarbon mol ratio is between 0.05:1 and 5:1, preferably between 0.5:1 to 2:1 for pentanes and hexanes and about 0.1:1 and 1:1 for butanes. The hydrogen and liquid hydrocarbon then pass into the isomerization vessel maintained under suitable conditions of temperature and pressure for the isomerization of the particular hydrocarbons being isomerized. As mentioned before, for hydrocarbon streams consisting chiefly of pentanes and hexanes, a temperature of 200–350° F. is suitable but a temperature between 280 and 330° F. is preferred. For lower molecular weight hydrocarbons, e.g., butane specifically, it is desired that the temperature be between 300 and 400° F. and most preferably within the range of 315–350° F. The pressure on the feed to the isomerization vessel 46 is between 300 and 500 p.s.i.g. The isomerizable hydrocarbon passes over an isomerization catalyst consisting of a platinum-alumina composite activated and stabilized in accordance with the process in U.S. 3,242,228. The liquid hourly space velocity of the hydrocarbons passing through isomerization vessel 46 is between 0.5 and 10.0, preferably within the range of 0.75 and 4.0. The effluent from the isomerization vessel 46 is withdrawn in line 48 and thence passes to high pressure separator 50 via cooler 49 wherein the effluent is partially cooled by exchange with cold water. Hydrogen is separated from the liquid isomerized hydrocarbon effluent in high pressure separator 50 and is discharged therefrom in line 52. This hydrogen is of relatively high purity since the impurities which were contained in the hydrocarbon feed in line 2 have been removed by a previous procedure which does not entail the introduction of hydrocarbon containing impurities into the isomerization vessel 46. More specifically, by recycling hydrogen containing impurities back to the hydrotreater 8 via line 20, scrubber 22, line 24, compressor 26, line 28 and line 10, the impurities are kept out of line 18, etc. It is to be realized that in large scale operations such as those for which the instant invention is particularly advantageous that some impurities are bound to pass through line 18 to pump 30 and enter line 32 in which case these impurities are removed selectively by use of a suitable molecular sieve, e.g., in hydrocarbon molecular sieve bed 34. By so doing, substantially all of the impurities are removed and the feed to the isomerization vessel 46 is extremely pure, particularly when a guard catalyst-sieve bed 44 containing hydrogenation catalyst and molecular sieve which adsorbs impurities such as water, ammonia and H₂S together with some lower molecular weight unsaturated hydrocarbons is employed. The hydrogenation catalyst provides final conversion of unsaturated compounds and retains sulfur impurities. Thus the isomerization catalyst in isomerization vessel 46 does not undergo any substantial rate of degradation due to the deleterious effects that these impurities have upon such an activated catalyst. The process can be run therefore for a period of say six months without the necessity for regeneration of the catalyst or any other procedures to counteract the harmful effects that these impurities normally have on the isomerization catalysts. The process thus enables high conversion of n-paraffins to isoparaffins for example, n-hexane to 2,2-dimethylbutane of say 32%.

The hydrogen leaving the high pressure separator 50 through line 52 is suitably recycled to the isomerization vessel 46 via pump 54 and line 56. This is particularly advantageous because it assures that a high concentration of the hydrogen entering the isomerization vessel to assist in the isomerization process is relatively pure and hence it is preferred that a substantial portion of the hydrogen used for this purpose be recycled hydrogen from the isomerization vessel. The use of the relatively pure hydrogen in the hydrotreating operation decreases the load on the molecular sieves 34 and 38 and hence regeneration of these sieves is less frequent. This results in substantial cost savings in operations and capital outlay.

If the amount of recycle hydrogen entering hydrotreater 8 via line 60 is insufficient, makeup hydrogen can be supplied from a catalytic reforming unit, the same source as the makeup hydrogen introduced via line 36. Any hydrogen not needed for the recycle to the isomerization vessel through pump 54 and line 56 is preferably recycled to the hydrotreating process via line 60. In so doing, the hydrogen utilized in the hydrotreating process is also relatively pure and hence more of the impurities admitted to the hydrotreater in line 6 are reacted with the hydrogen and removed from the hydrocarbon stream en route to the isomerization vessel 46. Hydrogen which flows through line 60 can be used to regenerate any molecular sieves by regulating a suitable valve 62 in line 64. Line 64 is shown in dotted lines since it is not essential to the design but is desired in commercial size units employing molecular sieves which from time to time need to be regenerated.

The liquid hydrocarbon discharged from separator 50 passes through line 70 and enters a series of fractional distillation vessels generally represented by vessel 72. This vessel 72 is a schematic diagram which in actual practice is a series of vessels which can be run in accordance with well-known procedures to take off the various fractions set forth in the flow diagram.

It is seen from the foregoing description of this invention that what is provided is a relatively simple, highly useful, commercially feasible design for an isomerization process in which the hydrogenation of the impurities can be regulated separately from the isomerization process itself. It is also seen that the invention provides an isomerization process in which the catalyst is kept relatively free of impurities which tend to deactivate same. It is also apparent that the process can suitably eliminate the use of vessels now considered necessary as pretreatment vessels for hydroisomerization processes, especially the use of a guard sieve case immediately preceding the isomerization reactor. It is to be realized that while the process is preferably performed using a guard sieve bed, the specific design set forth herein does not necessitate the use of a guard sieve bed and hence the elimination of such a bed is a significant advantage provided by this invention.

In order to more fully illustrate the nature of this invention and the manner of practicing the same the following example is presented.

EXAMPLE

A debutanized light straight run naphtha boiling in a temperature range of about 90 to 250° F. and containing 250 p.p.m. sulfur is fed through line 2 of the accompanying flow diagram into fractionator 4. A fraction containing $C_5$–$C_6$ hydrocarbon is taken overhead at a temperature of between 90 and 200° F. through line 6. The fraction contains about 3.2% by weight aromatics and 29 p.p.m. sulfur. This fraction enters line 10 en route to hydrotreater 8. Recycle hydrogen from line 60 and recycle hydrogen from line 28 enters line 10 together with the $C_5$–$C_6$ hydrocarbon charge. The temperature of the hydrocarbons in hydrotreater 8 is about 690° F. and the pressure upon the reaction mixture is about 450 p.s.i.g. The charge passes through hydrotreater 8 at 4.0 LHSV and enters line 14. The hydrogen and other gaseous material containing impurities in the form of water, $H_2S$, $NH_3$, etc., are separated from the liquid hydrocarbon in separator 16 which maintains a pressure on the hydrotreater effluent of about 450 p.s.i.g. and passes through a conventional scrubber 22 which absorbs a substantial amount of the impurities. The gaseous effluent from the scrubber 22 continues through line 24. This effluent which is relatively clean is recycled to hydrotreater 8 via pump 26, line 28 and line 10. Some recycle hydrogen from isomerization vessel 46 is fed to hydrotreater 8. The catalyst in the hydrotreater 8 is a nickel-molybdenum on alumina catalyst sold by American Cyanamid under the designation HDS-3.

The liquid hydrocarbon is discharged from separator 16 into line 18 and pumped using pump 30 through line 32 and enters hydrocarbon molecular sieve bed 34 containing a bed of 4 A. molecular sieve and a bed of 13X molecular sieve. The liquid hourly space velocity of the hydrocarbons through this molecular sieve bed is about 4.5. The temperature of the liquid hydrocarbon feed passing through line 32 is about 100° F. Makeup hydrogen from a catalytic reforming unit enters the process via line 36 and is independently purified by passing through a 4 A. sieve in hydrogen molecular sieve bed 38. It is discharged into line 40 after flowing through the bed at a weight hourly space velocity of about 6.0. The hydrogen discharged from hydrogen molecular sieve bed 38 through line 40 joins with the liquid hydrocarbon 42 and together they pass through a guard sieve bed containing a nickel on refractory support hydrogenation catalyst sold under the designation Harshaw Ni–1404–T into isomerized vessel 46 which contains a platinum-alumina composite activated by addition of $CCl_4$ and stabilized by heating for 2 hours at 1,000° F. in accordance with U.S. 3,242,228. The liquid hourly space velocity of the isomerizable hydrocarbon charge through the isomerization vessel 46 is about 2.0. The temperature within the isomerization vessel 46 is between 280 and 330° F. and the pressure within the vessel is about 500 p.s.i.g. The hydrocarbon isomerization process effluent is discharged in line 48, cooled to 105° F. by exchange with cold water and enters high pressure separator 50 where the relatively pure hydrogen is separated from the isomerized hydrocarbon and leaves the high pressure separator 50 in line 52 for recycle to the isomerization process via pump 54 and line 56. A substantial portion of the hydrogen effluent from the isomerization vessel 46 is recycled to the hydrotreater 8 via line 60 and line 10 to hydrotreater 8. The isomerized hydrocarbons are discharged from high separator 50 into line 70 and undergo a series of distillation steps in fractionating towers generally represented by 72 to separate the hydrocarbons into the fractions designated. The hydrogen from line 60 as stated above is relatively pure and is used in hydrotreater 8 directly without imposing appreciable loads on the molecular sieve beds used for retention of the impurities. The temperature of the effluent from the isomerization vessel 46 in line 48 is about 105° F. after cooling and the high pressure separator is maintained at a pressure of about 500 p.s.i.g. The temperature of the hydrogen in line 52 is about 85° F. and the temperature of the isomerized hydrocarbons in line 70 is about 85° F.

It is thus seen that a significantly useful, relatively simple process design for the isomerization of isomerizable hydrocarbons, particularly those in the $C_4$–$C_6$ range, has been provided by the instant invention. The process enables isomerization of a liquid isomerizable hydrocarbon charge over a relatively long period of time by eliminating from the feed to the isomerization vessel substantial quantities of impurities which tend to deactivate the catalyst. The process also enables the separate manipulation of the hydrotreating portion of the overall process design from the isomerization process and hence allows for greater variation of the process. Still furthermore, the process permits the advantageous use of isomerization reactor effluent hydrogen as recycle to the hydrotreater without appreciably increasing the load on the molecular sieve beds thus minimizing cost in plant construction and process operation.

It should be mentioned that in the actual practice of this invention a pair of molecular sieve beds are used for every molecular sieve bed represented in the accompanying drawing. The reason for this is that one of the beds is used in the line while the other one is being regenerated. For this purpose gas is used to desorb the molecular sieves. Suitably this gas is hydrogen which can be recycle hydrogen from the isomerization vessel 46 via lines 52 and 60 entering the sieve beds positioned for regeneration through valve 62 and line 64. When the sieve bed is regenerated it is replaced in the process line and the sieve in the line is then regenerated.

Instead of using molecular sieves to purify the isomerizable hydrocarbon, a bath of molten sodium can be employed to selectively absorb water and sulfur compound from the hydrogenated hydrocarbon stream being passed therethrough. In such a case, the operating temperature of the vessel containing the molten sodium would be over 208° F., the melting point of the sodium, and the preferred temperature range would be about 335° F.–350° F. The preferred operating pressure is 500 p.s.i.g. or other pressure substantially the same as that employed in the isomerization reactor although lower pressures are satisfactory. In the process of passing the isomerizable hydrocarbon stream through the molten sodium, the water impurity contained therein reacts with the sodium to form the sodium hydroxide which remains in the sodium. Sulfur reacts with the sodium to form sodium sulfide which also remains in the sodium. The hydrogen and hydrocarbon stream pass out the top of the molten sodium vessel and are routed to the isomerization reactor.

In another modification of my invention the recycle hydrogen from the isomerization vessel 46 passing through line 60 can be recycled to the process via line 36.

The terms and expressions which have been employed herein are used as terms of description and not of limitation, as there is no intention, in the use of such terms and expressions, of excluding any equivalents of the features shown and described or portions thereof, but is recognized that various modifications are possible within the scope of the invention claimed. For instance, $C_7$ hydrocarbons can be isomerized using the process design of this invention. Generally, however, the conversion of n-heptane to isoheptane is lower than the conversion of n-hexane to isohexanes.

I claim:

1. A process for isomerizing a $C_4$ to $C_7$ isomerizable hydrocarbon containing an impurity selected from the group consisting of oxygen, oxygen compounds, sulphur, sulphur compounds, nitrogen compounds and unsaturated hydrocarbons which comprises:
    (a) hydrotreating said isomerizable hydrocarbon in the presence of a hydrogenation catalyst resistant to said impurity under hydrotreating conditions;
    (b) separating the product of (a) into an isomerizable hydrocarbon effluent and a gaseous effluent, said effluents each containing a portion of said impurity, and recycling a portion of said gaseous effluent to step (a);
    (c) selectively separating said impurity from said isomerizable hydrocarbon effluent and from a hydrogen stream wherein the so-treated isomerizable hydrocarbon and hydrogen pass through separate molecular sieve beds to separate impurites therein;
    (d) introducing hydrogen and said isomerizable hydrocarbon in a mole ratio of between 0.05:1 and 5:1 to an isomerization reactor containing an isomerization catalyst, said reactor maintained at a temperature of 200 to 400° F. and a pressure of between 300 and 750 p.s.i.g.;
    (e) withdrawing the isomerization effluent, separating hydrogen from said effluent and recycling at least a portion of said hydrogen to step (d); and
    (f) recycling at least a portion of said hydrogen from step (e) to step (a).

2. A process for isomerizing isomerizable hydrocarbon according to claim 1 wherein the catalyst resistant to said impurity under hydrotreating conditions is selected from the group consisting of nickel-molybdenum on alumina, cobalt-molybdenum on alumina, and nickel sulfide-tungsten sulfide on alumina.

3. A process according to claim 2 wherein said catalyst is nickel-molybdenum on alumina.

4. A process for isomerizing isomerizable hydrocarbon according to claim 1 wherein the hydrocarbons are a mixture of pentanes and hexanes, the hydrogen to hydrocarbon mol ratio is within the range of 0.5:1 to 2:1, the temperature of the hydrocarbons during the isomerization process is between 280 and 330° F., the pressure is between 300 and 750 p.s.i.g. and the liquid hourly space velocity of the hydrocarbon is in the range of 0.5 to 10.0.

5. A process for isomerizing isomerizable hydrocarbon according to claim 1 wherein the isomerizable hydrocarbon and hydrogen feed to the isomerization vessel are passed through a guard hydrogenation catalyst immediately before entering the isomerization vessel in order to hydrogenate any unsaturated hydrocarbons in the feed and to retain any impurities prior to introduction of the feed to the isomerization vessel.

References Cited

UNITED STATES PATENTS

| 2,951,888 | 9/1960 | Carr | 260—683.65 |
| 3,158,662 | 11/1964 | Reichle | 260—683.75 |

FOREIGN PATENTS

| 685,728 | 5/1964 | Canada. |

DELBERT E. GANTZ, Primary Examiner

G. J. CRASANAKIS, Assistant Examiner

U.S. Cl. X.R.

260—683.73